2,802,739
PROCESS OF PRODUCING DECAFFEINATED COFFEE EXTRACT

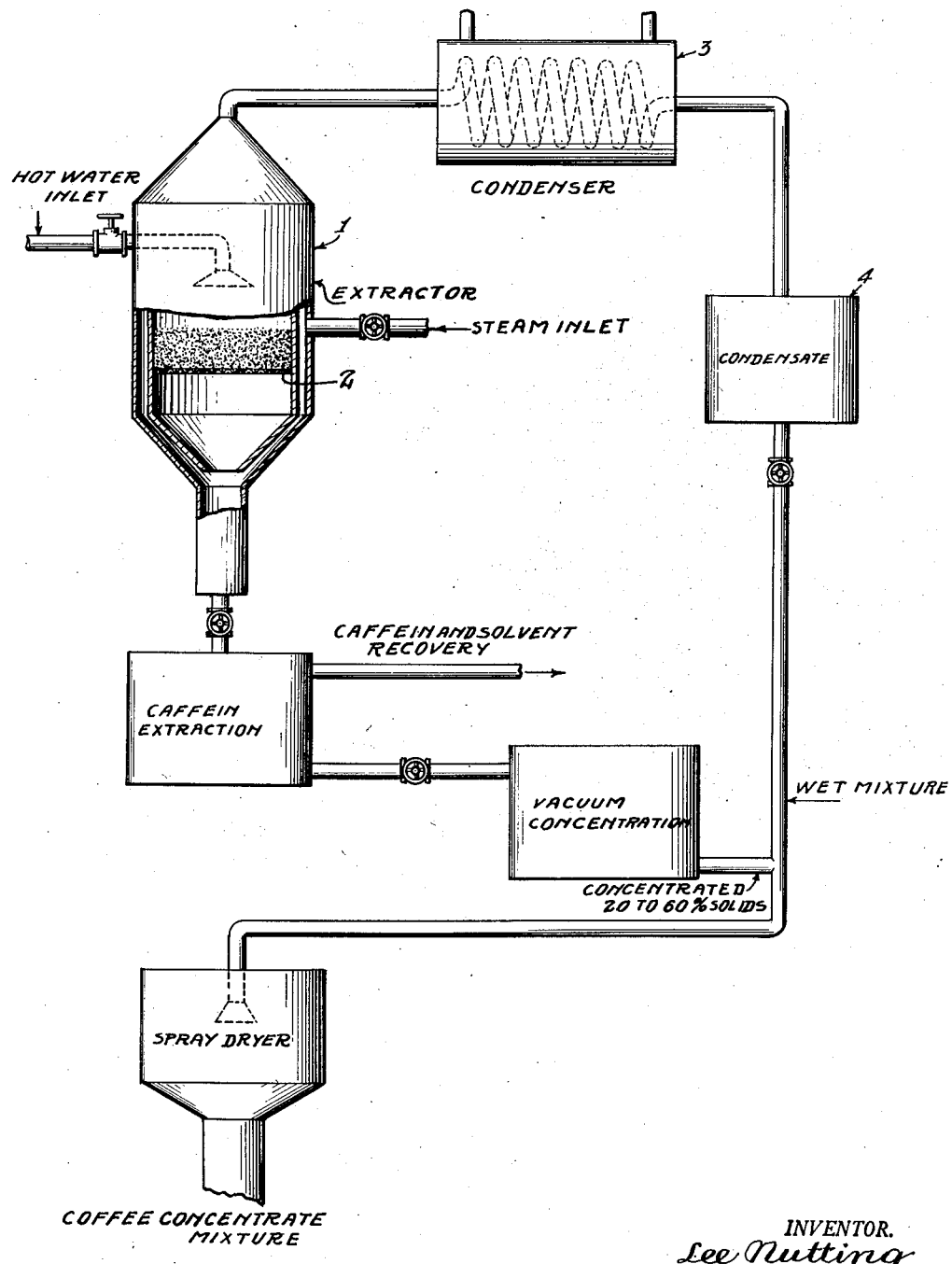

Lee Nutting, Berkeley, Calif., assignor to Hills Bros. Coffee, Inc., San Francisco, Calif., a corporation of California Application June 15, 1951, Serial No. 231,762

6 Claims. (Cl. 99—70)

This invention relates to a coffee concentrate from which the caffein has been removed in such manner as to avoid deterioration of the taste factors of the coffee and to the process of producing such decaffeinated coffee extract.

I have discovered that a decaffeinated coffee may be produced having substantially all of the flavor values of fresh roasted coffee where the caffein is removed from the coffee solution at a point in the process subsequent to the removal of the volatile constituents of the coffee.

The preparation of a coffee brewed from roasted ground coffee I have found results in the extraction from the ground coffee of two separable fractions which for the purpose of describing this invention I have classified as (1) the water soluble or water dispersible non-volatile materials, and (2) the volatile constituents which include the essential flavoring elements of the roasted coffee. The first class comprises the bulk of the concentrate ultimately formed in accordance with my invention while the second class contains a small quantity of flavoring elements essential to product quality.

I have discovered that by separating these two fractions that I am then able to remove from the first class of water soluble and water dispersible non-volatile materials the caffein so that it does not follow through the process and is not incorporated in the ultimate concentrate.

I have further discovered that the non-volatile water soluble or water dispersible fraction may be handled without appreciable deterioration and that by suitable solvent extraction I can remove the caffein from this fraction substantially completely so that when the two fractions are then recombined to produce the coffee concentrate, the concentrate will contain substantially no caffein but will in all other respects have all flavoring matters of freshly brewed coffee from roasted coffee beans.

The removal of caffein may not be complete to the point where the same would give a negative qualitative test. The removal is in the neighborhood of 95 to 97% of the total of the caffein which would otherwise be present in the coffee brew.

I have further discovered that I am able to recombine the separate fractions of the coffee extract in such a manner as to avoid substantial loss of the characteristic flavoring of the coffee. I am further able by the recombining of these flavoring matters and their subsequent reduction to a dry powder to produce a coffee brew by the addition of hot water to the dried powder which will not leave a disagreeable after taste.

It is therefore an object of my invention to produce a dry coffee concentrate from which the caffein has been removed and which concentrate includes both volatile and non-volatile flavoring matters or constituents of the ground roasted coffee.

It is further an object of my invention to prepare a dry coffee concentrate by a method which includes the steps of separating the non-volatile or water soluble or water dispersible constituents from the coffee, removing from the second fraction the caffein by suitable solvent extraction, and then recombining the volatile constituents of the volatile and non-volatile constituents from which the caffein has been removed to produce a product in dry form. By dry form I mean in this application a powder where the water concentration is reduced so that the powder has a dry appearance to the eye.

In the accompanying drawing I have diagrammatically illustrated the process embodying my invention.

In accordance with my invention the ground roasted coffee is treated with steam in an enclosed chamber or steam jacketed vessel 1 in which the coffee is supported upon a screen 2 and the steam is introduced in the bottom of the vessel, passed through the coffee supported upon the screen 2. The result of this process is to wet the ground coffee with a uniform addition of moisture due to the condensation of the steam upon the coffee. It is through this wetting of the ground roasted coffee that the volatile constituents are developed in the coffee and liberated therefrom and carried away by the steam that subsequently passes through the wetted ground coffee. The wetting of the roasted coffee opens a cellular structure to thereby facilitate the removal of the volatile constituents permitting the rapid extraction and subsequently the rapid draining in the course of the water extraction to remove the non-volatile constituents. The steam after passing through the ground coffee is condensed in a suitable condenser 3 and is collected in a suitable collection vessel 4. There is thus formed a distillate or condensate containing the volatile constituents of the coffee in water.

Following the removal of the volatile constituents from the ground roasted coffee, a water extraction is prepared which is a water solution or water dispersion of the body factors of the coffee. This extraction is made preferably with water which is at or near the boiling point in order to hasten the rate of extraction. The water is poured over the ground coffee supported upon the screen 2 and the water is collected after passing through the ground coffee. This steeping extraction may be performed in a single operation. However, I have found that this extraction is best carried out in three successive steps using separate volumes of boiling water. I have found by this method that I can obtain the same extraction of the water soluble or water dispersible portions of the ground roasted coffee using a smaller total volume of water. This is of importance because the water has to be later removed. Each of the three steps includes (1) applying a definite volume of boiling water to the ground roasted coffee; (2) steeping the coffee for a suitable period of time to extract the non-volatile water soluble or water dispersible constituents, and (3) draining the resultant water from the coffee bed. The three extracts are then combined and concentrated. Any suitable process of extracting the body material from the ground coffee may be followed such, for example, as by steeping, percolating or the like.

The caffein is extracted from the aqueous extraction by use of a suitable solvent and preferably prior to the concentration. Any suitable solvent for the caffein may be utilized as, for example, chloroform, carbon tetrachloride, benzene, tetrachloroethane, or any other well known caffein solvent. The sublimation point of dry caffein is 356° F. so that substantially all of the cafein remains in the ground coffee during the steam extraction process and is not liberated from the coffee during the removal of the volatile flavoring matters through the first steam extraction process, and the caffein which would ordinarily be carried into the concentrate is extracted from the ground coffee during the water steeping operations.

I prefer to carry out the concentration of the aqueous extraction by evaporation under reduced pressure in order to lower the temperature under which the evaporation takes place. This minimizes the possibility of changes in the non-volatile constituents during the concentration process. After the aqueous extraction has reached a suitable degree of condensation, it is mixed with the condensate containing the volatile constituents initially separated from the coffee by means of the steam treatment. The concentrated extraction and volatile constituents are then rapidly dried, producing a decaffeinated dry coffee concentrate containing the aqueous extractions, and also the volatile constituents of the roasted coffee with their essential flavoring matters.

Removal of this caffein by means of the solvent from the aqueous extraction therefore enables me to produce a coffee concentrate which is substantially free of caffein. By removal of the caffein from the water extraction any solvent which remains and is not removed from the water extraction by such procedures as decanting the non-miscible solvent from the water extraction is liberated from the water extraction during the water concentration process carried out under reduced pressure. The process of my invention may be carried out equally well by means of a batch or a continuous process.

As a specific example of one method by which my invention may be carried out but not necessarily limiting the same to the specific time temperatures or proportions set forth which may vary considerably for different types, blends, or conditions of roasts or grinds of coffee, the following is given:

Finely ground freshly roasted coffee initially at room temperature is subjected to the action of steam at atmospheric pressure in the steam jacketed apparatus. The coffee is supported on the screens 2 so that the steam passes through the bed of ground roasted coffee. When the steam is first supplied to the coffee the steam condenses on the coffee while heating it to increase uniformly the moisture content of the ground roasted coffee.

During this initial period, substantially all of the steam is condensed on and absorbed by the coffee in the bed. During this initial wetting process, the zone in which the steam condenses in the coffee advances through the bed and until this advance is completed, there is substantially no flow of steam beyond the coffee. This addition of moisture and warming of the roasted coffee by means of the latent heat of the steam condensed causes rapid liberation of the volatile flowing materials. The quantity of moisture uniformly condensed by each particle of coffee while it is being warmed to steam temperature is not sufficient to give the ground roasted coffee a wet appearance.

The steam jacket serves to prevent heat loss from the steaming chamber and aids in maintaining the temperature of the coffee as uniform as possible. If it were not for the steam jacket, the steam would condense on the inner surfaces of the apparatus and excess moisture might be taken up by the coffee adjacent to the walls resulting in a localized complete saturation of the coffee particles. Such saturation of the coffee leads to a reduction in the yield of volatile constituents contained in the coffee by the steam treatment thereof.

The steam treatment is continued after the wetting of the coffee as above set forth and the steam passes through the coffee in the bed and carries away with the volatile substances. The steam and volatiles pass then into a water cooled condenser and are condensed and then collected.

As the steaming of the roasted coffee continues, it is found that the concentration of the volatile substances in the distillate decreases. The quantity of distillate obtained per unit weight of the coffee may be varied in accordance with the needs of the further steps in the preparation of the dry coffee concentrate.

After the steaming of the coffee is completed, it is then extracted with water to form an extraction of the body materials. This extraction may be by any of the well known processes of steeping, percolating, or the like. Where steeping is used, I have found by using three successive portions of boiling water I use less water than the amount normally used in boiling coffee directly for beverage use and this is done to minimize the amount of water which subsequently must be evaporated. However, the extraction of the ground roasted coffee with the boiling water using three successive portions of the boiling water permits me to obtain a satisfactory and economical yield of the non-volatile extractives with this reduced quantity of water. The amount of water in the aqueous extractive obtained is then decreased by reduced pressure evaporation to give a total solid content after combining with the aqueous solution of volatile constituents suitable for use in the final rapid drying step.

Before addition of the condensate of volatile constituents with the aqueous extraction, I add to the aqueous extraction the selected caffein solvent, mixing the solvent and aqueous extraction thoroughly and allowing the same to stand for a sufficient period of time to enable these two relatively non-miscible liquids to separate and then, by decanting, separate the solvent containing the caffein from the water extraction. Any portion of the solvent which remains with the water extraction of the coffee is later evaporated therefrom during the reduced pressure concentration of the water extractive fraction.

After mixing the concentrated water extractive with the flavor containing condensate, this mixture is then dried or concentrated to a dry powder. The dry powder produced by the method described makes a beverage of satisfactory cup strength on the basis of 1.5 grams of dry coffee concentrate per 100 cc. of hot tap water. The beverage produced in a large measure possesses the ordinary characteristics of a brew freshly prepared from ground roasted coffee. The extraction of the caffein therefrom does not affect flavor characteristics of the brew and the brew does not leave a disagreeable after taste accounted for by the fact that it contains the essentials of freshly brewed coffee and has no greater tendency to leave an after taste in the mouth than does freshly brewed coffee.

My invention is of the full scope of the appended claims.

I claim:

1. A process of preparing a dry coffee concentrate with restored volatile flavor constituents including the steps of introducing steam into ground roasted coffee to wet and to liberate the volatile constituents thereof, condensing the steam and volatiles mixture to form an extract of the volatile constituents of the coffee, subsequently treating the ground roasted coffee with water to form an aqueous extraction, removing caffein from said aqueous extraction, concentrating the aqueous extraction to reduce the water content thereof, then mixing the concentrated aqueous extract with the extract of the volatile constituents and then drying the mixture.

2. A process of preparing a dry coffee concentrate with restored volatile flavor constituents including the steps of introducing steam into ground roasted coffee to wet and to liberate the volatile constituents thereof, condensing the steam and volatiles mixture to form an extract of the volatile constituents of the coffee, subsequently treating the ground roasted coffee with water to form an aqueous extraction, removing caffein from said aqueous extraction, concentrating the aqueous extraction to reduce the water content thereof, then mixing the concentrated aqueous extract with the extract of the volatile constituents and then concentrating the mixture.

3. A process of preparing coffee concentrates which includes the steps of wetting and liberating from ground roasted coffee the volatile constituents by treating the same with steam and then collecting the volatiles, then treating the coffee with water to form an aqueous extraction of the non-volatile constituents of the coffee, removing caffein from said aqueous extraction, concentrating the water extraction from the coffee, combining the concentrated water extraction with the separately collected volatile constituents, and then drying the combined extractions.

4. A process of preparing a dry coffee concentrate with restored volatiles, including the steps of passing steam through ground roasted coffee to wet and to liberate the volatile constituents thereof, collecting and condensing the steam and volatiles together to form an extract of volatiles, then making an aqueous extraction of the coffee, removing caffein from said aqueous extraction, concentrating the aqueous extraction to a semi-solid or dry state, mixing the said product with the extract of volatiles, and drying the mixture to form a dry concentrate.

5. A process of preparing a dry coffee concentrate with restored volatiles, including the steps of passing steam through ground roasted coffee to wet and to liberate the volatile constituents thereof, condensing the mixture of steam and volatiles, treating the coffee with water to form an aqueous extraction of the non-volatile constituents of the coffee, removing caffein from said aqueous extraction, concentrating the aqueous extraction under vacuum, then mixing the volatile constituents with the concentrated aqueous extraction, and drying the combined extractions.

6. A process of preparing a coffee concentrate including the steps of wetting ground coffee and then extracting the volatile constituents of the coffee to form a small volume of water extract containing said volatile constituents and then passing water through the ground coffee to prepare a water extract therefrom after the volatiles have been removed, removing caffein from said water extract, concentrating the latter extract by volatilizing water therefrom, mixing the first volatile extract with the concentrate of the latter extract, and then concentrating the mixture.

References Cited in the file of this patent
UNITED STATES PATENTS

| | | |
|---|---|---|
| 1,123,827 | Whitaker et al. | Jan. 5, 1915 |
| 1,414,096 | Roseluis | Apr. 25, 1922 |
| 2,007,405 | Meijer | July 9, 1935 |
| 2,335,206 | Darling | Nov. 23, 1943 |
| 2,472,121 | Ornfelt | June 7, 1949 |